US012601996B2

(12) United States Patent
Kajiwara et al.

(10) Patent No.: US 12,601,996 B2
(45) Date of Patent: Apr. 14, 2026

(54) FIXING MEMBER, FIXING DEVICE, AND IMAGE FORMING APPARATUS

(71) Applicant: FUJIFILM Business Innovation Corp., Tokyo (JP)

(72) Inventors: Kenji Kajiwara, Kanagawa (JP); Hiroaki Tanaka, Kanagawa (JP); Ryohei Yoshikawa, Kanagawa (JP); Taiki Nagamatsu, Kanagawa (JP); Tomotake Inagaki, Kanagawa (JP); Masayuki Seko, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/814,562

(22) Filed: Aug. 25, 2024

(65) Prior Publication Data

US 2025/0231509 A1 Jul. 17, 2025

(30) Foreign Application Priority Data

Jan. 17, 2024 (JP) ................................ 2024-005542

(51) Int. Cl.
*G03G 15/20* (2006.01)

(52) U.S. Cl.
CPC ....... *G03G 15/2057* (2013.01); *G03G 15/206* (2013.01); *G03G 15/2064* (2013.01)

(58) Field of Classification Search
None
See application file for complete search history.

(56) References Cited

U.S. PATENT DOCUMENTS

| | | | | |
|---|---|---|---|---|
| 6,231,954 B1 * | 5/2001 | Yoshida | C08L 83/04 428/36.9 |
| 2005/0214036 A1 * | 9/2005 | Embry | G03G 15/1685 399/302 |
| 2006/0210332 A1 * | 9/2006 | Tsueda | G03G 15/2014 399/333 |
| 2007/0197362 A1 * | 8/2007 | Sakata | G03G 15/2057 492/53 |
| 2012/0064350 A1 * | 3/2012 | Honya | G03G 15/0189 399/302 |
| 2013/0170881 A1 * | 7/2013 | Yamana | G03G 15/2064 399/329 |
| 2014/0017605 A1 * | 1/2014 | Shirayama | G03G 5/0592 399/111 |

(Continued)

FOREIGN PATENT DOCUMENTS

| | | |
|---|---|---|
| JP | 2006259712 | 9/2006 |
| JP | 2015118327 | 6/2015 |

(Continued)

OTHER PUBLICATIONS

Etsy, "vintage wooden bread box", retrieved Jul. 11, 2025, from "before 2000".*

*Primary Examiner* — Sevan A Aydin
(74) *Attorney, Agent, or Firm* — JCIPRNET

(57) ABSTRACT

A molded body contains a resin and a filler dispersed in the resin, in which, in a case where a Martens hardness is measured at 10 locations within a region of 50 mm square on a maximum surface of the molded body, a difference between a maximum value and a minimum value of the Martens hardness is 200 N/mm$^2$ or more.

18 Claims, 4 Drawing Sheets

(56) References Cited

U.S. PATENT DOCUMENTS

| | | | | |
|---|---|---|---|---|
| 2015/0212461 A1* | 7/2015 | Abe | G03G 15/2057 428/447 |
| 2016/0378031 A1* | 12/2016 | Takahashi | G03G 15/2053 399/329 |
| 2020/0333740 A1* | 10/2020 | Miyagawa | G03G 21/0017 |
| 2025/0155841 A1* | 5/2025 | Nihonyanagi | G03G 15/2064 |

FOREIGN PATENT DOCUMENTS

| | | | | |
|---|---|---|---|---|
| JP | 2016218427 | | 12/2016 | |
| JP | 2022042562 | | 3/2022 | |
| JP | 2022061516 | A * | 4/2022 | |
| WO | 2011111684 | | 9/2011 | |
| WO | WO-2025004963 | A1 * | 1/2025 | G03G 15/20 |

* cited by examiner

FIXING MEMBER, FIXING DEVICE, AND IMAGE FORMING APPARATUS

CROSS-REFERENCE TO RELATED APPLICATIONS

This application is based on and claims priority under 35 USC 119 from Japanese Patent Application No. 2024-005542 filed Jan. 17, 2024.

BACKGROUND

(i) Technical Field

The present disclosure relates to a molded body, a composite, a tubular fixing member, a fixing device, and an image forming apparatus.

(ii) Related Art

JP2006-259712A discloses a seamless-type cylindrical heating and fixing member having an elastic layer, in which carbon fibers are arranged in the elastic layer, and a thermal conductivity in a thickness direction of the elastic layer is 1.0 W/m·K or more.

WO2011/111684A discloses a thermally conductive laminate that includes an insulating layer and a metal layer. The insulating layer includes at least one filler-containing polyimide resin layer containing thermally conductive fillers in a polyimide resin, and the metal layer is laminated on one or both surfaces of the insulating layer. The content of the thermally conductive fillers in the filler-containing polyimide resin layer is in a range of 35 to 80 vol %, the maximum particle size of the thermally conductive filler is less than 15 μm, the thermally conductive fillers include plate-shaped fillers and spherical fillers, an average major diameter DL of the plate-shaped fillers is in a range of 0.1 to 2.4 μm, and the thermal conductivity $\lambda z$ of the insulating layer in a thickness direction is 0.8 W/m·K or more.

JP2015-118327A discloses a resin substrate containing a resin, first filler that has an aspect ratio of 2 or more and is dispersed in the resin in a state of being aligned in an in-plane direction of the substrate, and a second filler that has an aspect ratio of 2 or more and a major axis shorter than a major axis of the first filler and is dispersed in the resin in a state of being aligned in a thickness direction of the substrate.

JP2016-218427A discloses a structure consisting of a semiconductor resin composition containing a thermoplastic resin and a conductive resin incompatible with the thermoplastic resin, in which a Martens hardness measured in a vertical direction from a surface of the structure is 50 (N/mm$^2$) or more, and a difference between a maximum value and a minimum value of the Martens hardness measured at any 10 points is 20 (N/mm$^2$) or less.

JP2022-042562A discloses a fixing device that fixes a toner image formed on a recording material to the recording material, the fixing device including a rotationally provided endless fixing belt, a backup member that is non-rotationally provided on an inner side of the fixing belt and slides on an inner peripheral surface of the fixing belt, and a rotating body that forms a fixing nip portion that comes into contact with an outer peripheral surface of the fixing belt such that the fixing belt is sandwiched between the fixing nip portion and the backup member, and that holds and transports the recording material to fix the toner image to the recording material, in which the fixing belt includes a base body and a sliding layer that is formed on an inner periphery of the base body and is brought into contact with and slides on the backup member, a surface roughness of a contact surface between the sliding layer and the backup member is 0.10 μm or more and less than 0.15 μm in terms of a ten-point average roughness, and a hardness of the sliding layer is 80 or more and 90 or less in terms of a Martens hardness and in a case where surface hardness of the backup member is defined as a ten-point average roughness A and a surface hardness of the sliding layer is defined as a ten-point average roughness B, the surface roughness of the sliding layer satisfies $0.35\ \mu m < A+B < 0.6\ \mu m$.

SUMMARY

Aspects of non-limiting embodiments of the present disclosure relate to a molded body that contains a resin and a filler and has excellent thermal conductivity as compared with a molded body in which, in a case where a Martens hardness is measured at 10 locations within a region of 50 mm square on a maximum surface of the molded body, a difference between a maximum value and a minimum value of the Martens hardness is less than 200 N/mm$^2$.

Aspects of non-limiting embodiments of the present disclosure relate to a molded body that contains a rubber and a filler and has excellent thermal conductivity as compared with a molded body in which, in a case where a Martens hardness is measured at 10 locations within a region of 50 mm square on a maximum surface of the molded body, a difference between a maximum value and a minimum value of the Martens hardness is less than 5 N/mm$^2$.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

Specific methods for achieving the above-described object include the following aspects.

According to an aspect of the present disclosure, there is provided a molded body containing a resin and a filler dispersed in the resin, in which, in a case where a Martens hardness is measured at 10 locations within a region of 50 mm square on a maximum surface of the molded body, a difference between a maximum value and a minimum value of the Martens hardness is 200 N/mm$^2$ or more.

BRIEF DESCRIPTION OF THE DRAWINGS

Exemplary embodiment(s) of the present invention will be described in detail based on the following figures, wherein.

DETAILED DESCRIPTION

Figure 1:
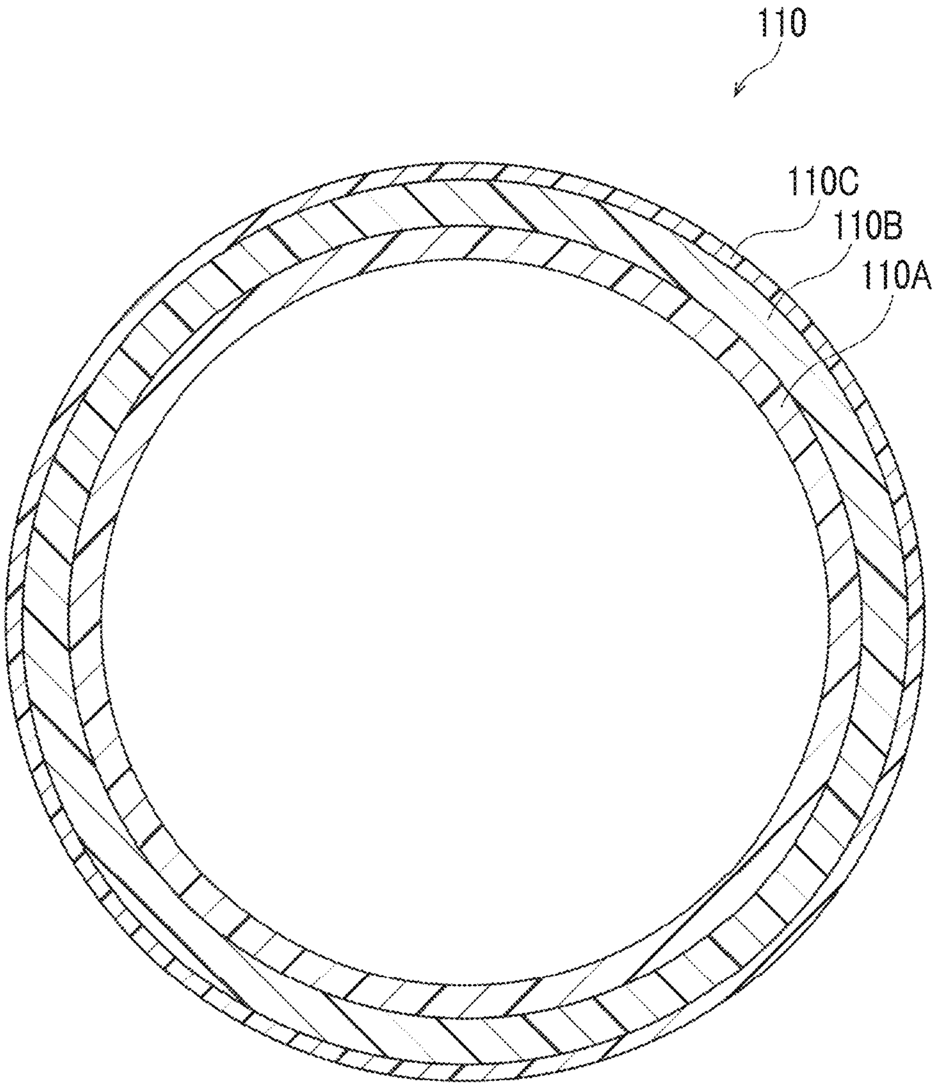
FIG. 1 is a schematic cross-sectional view showing an example of a tubular fixing member according to an exemplary embodiment of the present disclosure.

The exemplary embodiments of the present disclosure will be described below. The description and examples of these exemplary embodiments illustrate the exemplary embodiments and do not limit the scopes of the exemplary embodiments.

In the present disclosure, "A and/or B" is synonymous with "at least one of A or B". That is, "A and/or B" means that A alone may be used, B alone may be used, or a combination of A and B may be used.

In the present disclosure, a numerical range described using "to" represents a range including numerical values listed before and after "to" as the minimum value and the maximum value respectively.

Regarding the numerical ranges described in stages in the present disclosure, the upper limit value or lower limit value of one numerical range may be replaced with the upper limit value or lower limit value of another numerical range described in stages. In addition, in the present disclosure, the upper limit or lower limit of a numerical range may be replaced with values described in examples.

In the present disclosure, the term "step" includes not only an independent step but a step that is not clearly distinguished from other steps as long as the purpose of the step is achieved.

In the present disclosure, in a case where an exemplary embodiment is described with reference to drawings, the configuration of the exemplary embodiment is not limited to the configuration shown in the drawings. In addition, the sizes of members in each drawing are conceptual, and a relative relationship between the sizes of the members is not limited thereto.

In the present disclosure, each component may include a plurality of corresponding substances. In a case where the amount of each component in a composition is mentioned in the present disclosure, and there are a plurality of types of substances corresponding to each component in the composition, unless otherwise specified, the amount of each component means the total amount of the plurality of types of substances present in the composition.

In the present disclosure, each component may include two or more types of corresponding particles. In a case where there are two or more types of particles corresponding to each component in a composition, unless otherwise specified, the particle size of each component means a value for a mixture of two or more types of the particles present in the composition.

In the present disclosure, "axial direction" of a tubular fixing member means a direction in which a rotation axis of the tubular fixing member extends and "circumferential direction" of the tubular fixing member means a rotation direction of the tubular fixing member.

Molded Body

The present disclosure provides a first molded body and a second molded body. In a case of describing a matter common to the first molded body and the second molded body, the term "molded body according to the exemplary embodiment of the present disclosure" is used collectively.

The first molded body contains a resin and a filler dispersed in the resin, and in a case where a Martens hardness is measured at 10 locations within a region of 50 mm square on a maximum surface of the molded body, the difference between the maximum value and the minimum value of the Martens hardness is 200 N/mm$^2$ or more.

The second molded body contains a rubber and a filler dispersed in the rubber, and in a case where a Martens hardness is measured at 10 locations within a region of 50 mm square on a maximum surface of the molded body, the difference between the maximum value and the minimum value of the Martens hardness is 5 N/mm$^2$ or more.

A method of measuring the Martens hardness of the molded body according to the exemplary embodiment of the present disclosure will be described. Hereinafter, the difference between the maximum value and the minimum value of the Martens hardness, in a case where the Martens hardness is measured at 10 locations within a region of 50 mm square on a maximum surface of the molded body, is referred to as the "Martens hardness difference".

The sample to be measured is a sample of 50 mm×50 mm×thickness direction, which has been taken from the middle portion of the maximum surface of the molded body while maintaining the thickness of the molded body.

The Martens hardness is measured by a nanoindentation method using a microhardness tester (for example, FISCHERSCOPE HM2000) conforming to ISO 14577. The indenter is a Vickers indenter (a diamond square pyramid with a facing angle of) 136°. A measurement environment is a temperature of 28° C. and a relative humidity of 60%.

The sample is fixed to the sample table of the measuring device. A load is applied to the sample up to 500 mN over 20 seconds, and the load is maintained at 500 mN for 5 seconds. Next, the load is reduced to 5 mN over 20 seconds, and the load is maintained at 5 mN for 1 minute.

During the above-described load addition and load removal, the indentation depth is measured to obtain a load-displacement curve, and the Martens hardness (N/mm$^2$) is determined from the load-displacement curve.

Any 10 points within a region of 50 mm square are measured, and the difference between the maximum value and the minimum value of the Martens hardness (N/mm$^2$) is calculated.

The first molded body has excellent thermal conductivity in a case where a Martens hardness difference is 200 N/mm$^2$ or more. The second molded body has excellent thermal conductivity in a case where a Martens hardness difference is 5 N/mm$^2$ or more. The mechanism is presumed as follows.

In a case where the filler is uniformly dispersed in the molded body, the Martens hardness difference of the molded body is small. In other words, a large Martens hardness difference of the molded body indicates that the filler is unevenly distributed within the molded body. The fillers that are unevenly distributed have a relatively short mutual distance, that is, the fillers are close to each other and form a heat conduction path. The molded body according to the exemplary embodiment of the present disclosure conducts heat through a heat conduction path formed of unevenly distributed fillers, thereby the molded body has excellent thermal conductivity.

From the viewpoint of excellent thermal conductivity, the first molded body has the Martens hardness difference of 200 N/mm$^2$ or more, for example, preferably 220 N/mm$^2$ or more, and more preferably 250 N/mm$^2$ or more.

From the viewpoint of mechanical strength, for example, the Martens hardness difference of the first molded body is preferably 500 N/mm$^2$ or less, more preferably 400 N/mm$^2$ or less, and still more preferably 350 N/mm$^2$ or less.

From the viewpoint of excellent thermal conductivity, the second molded body has a Martens hardness difference of 5 N/mm$^2$ or more, for example, preferably 10 N/mm$^2$ or more, and more preferably 15 N/mm$^2$ or more.

From the viewpoint of mechanical strength, for example, the Martens hardness difference of the second molded body is preferably 30 N/mm$^2$ or less, more preferably 25 N/mm$^2$ or less, and still more preferably 20 N/mm$^2$ or less.

The Martens hardness difference of the molded body according to the exemplary embodiment of the present disclosure can be controlled, for example, by the following means.

(1) Two or more types of fillers with different shapes are used and the fillers are unevenly distributed by adjusting the distance between the mixing means (for example, a plurality of roll mills) and/or mixing speed when kneading the resin or rubber with the fillers.

(2) Two or more types of fillers with different surface properties from each other are used, and the fillers are unevenly distributed by bonds that exhibit these surface properties.

(3) A filler having a relatively large aspect ratio (for example, preferably a filler having an average aspect ratio of 10 or more) is used and the filler is oriented in the thickness direction of the molded body by adjusting the distance between the mixing means (for example, a plurality of roll mills) and/or mixing speed when kneading the resin or rubber with the fillers.

Hereinafter, the materials constituting the molded body of the exemplary embodiment of the present disclosure will be described in detail.

Resin and Rubber

The first molded body contains resin. One type of resin may be used alone, or two or more types of resins may be mixed and used.

Examples of the resin include a polyimide resin, a polyamide resin, a polyamideimide resin, a thermotropic liquid crystal polymer, a fluororesin, a silicone resin, a polystyrene resin, and the like. One type of resin may be used alone, or two or more types of resins may be mixed and used. From the viewpoint of the heat resistance of the molded body, it is preferable that, for example, a polyimide resin is used as the resin.

The second molded body contains a rubber. One type of rubber may be used alone, or two or more types of rubber may be mixed and used.

Examples of the rubber include an acrylic rubber, a silicone rubber, a fluorosilicone rubber, a fluororubber, and the like. One type of rubber may be used alone, or two or more types of rubber may be mixed and used. From the viewpoint of the heat resistance of the molded body, for example, an acrylic rubber or a silicone rubber is preferable as the rubber.

Filler

The molded body of the exemplary embodiment of the present disclosure contains a filler. One type of filler may be used alone, or two or more types of fillers may be mixed and used.

From the viewpoint of thermal conductivity, the material of the filler is, for example, preferably carbon material; silicon carbide; metal nitrides such as aluminum nitride and boron nitride; metal oxides such as aluminum oxide (alumina), boehmite (alumina monohydrate), silica, titania, zirconia, magnesium oxide, tin oxide, zinc oxide, and barium oxide; or the like.

Examples of the filler of the exemplary embodiment include at least one type of ceramic particles selected from the group consisting of aluminum nitride, boron nitride, and silicon carbide.

Examples of the filler of the exemplary embodiment include carbon fibers, such as carbon nanofibers and carbon nanotubes.

The shape of the filler may be any of a particulate shape, a fibrous shape, a branched shape, a plate shape, a scale shape, a flake shape, or the like.

Examples of the exemplary embodiment of the filler include an aspect in which two or more types of fillers having different shapes from each other are included.

Specific examples of the two or more types of fillers having different shapes from each other include a combination of a filler having a relatively large aspect ratio (for example, a fibrous filler, a plate-shaped filler, a scale-shaped filler, or a flake-shaped filler) and a particulate filler.

The particulate fillers are scattered between the fillers having a relatively large aspect ratio, thereby it is likely realized that the fillers are unevenly distributed to form a heat conduction path, that is, that the Martens hardness difference is increased.

In a case where the molded body contains two types of fillers having different shapes from each other, a content ratio of the two types of fillers may be, for example, 35:65 to 65:35, 40:60 to 60:40, or 45:55 to 55:45 on a volume basis.

Examples of the exemplary embodiment of the filler include an aspect in which two or more types of fillers having different surface properties from each other are included.

Specific examples of the two or more types of fillers having different surface properties from each other include a combination of a filler having an acidic group on the surface and a filler having a basic group on the surface; and a combination of a positively charged filler and a negatively charged filler.

Since the two or more types of fillers having different surface properties from each other are in close to each other because of forces such as intermolecular forces, van der Waals forces, electrostatic attraction, ion bonding, and covalent bonding, it is easily realized that the fillers are unevenly distributed to form a heat conduction path, that is, that the Martens hardness difference is increased.

The surface properties of the filler can be imparted to the filler by performing a surface treatment on the filler with a coupling agent or a surfactant.

In a case where the molded body contains two types of fillers having different surface properties from each other, a content ratio of the two types of fillers may be, for example, 35:65 to 65:35, 40:60 to 60:40, or 45:55 to 55:45 on a volume basis.

Examples of the exemplary embodiment of the molded body include an aspect in which a first filler having a first functional group on a surface and a second filler having a second functional group different from the first functional group on the surface are included. The first functional group and the second functional group are different type from each other.

The first filler and the second filler are connected or in close to each other by an attractive force or a reaction (for example, intermolecular force, van der Waals force, electrostatic attraction, ion bonding, or covalent bonding) between the first functional group and the second functional group, thereby it is easily realized that the fillers are unevenly distributed to form a heat conduction path, that is, that the Martens hardness difference is increased.

Examples of a combination of the first functional group and the second functional group include a combination of an acidic group and a basic group, and specific examples thereof include a combination of a carboxy group or a hydroxy group and an amino group.

In addition, examples thereof include a combination of an isocyanate group and a hydroxy group; a combination of an epoxy group and an amino group; and the like.

The filler having a functional group on the surface can be produced by performing surface treatment on the filler with a coupling agent that has a functional group.

The type of functional group present on the surface of the filler can be confirmed from the peak intensity of the functional group obtained by infrared absorption spectrum (IR) measurement.

For example, it is preferable that the first filler having the first functional group on the surface and the second filler having the second functional group on the surface have different shapes from each other. Specific examples of the two types of fillers having different shapes from each other include a combination of a filler having a relatively large aspect ratio (for example, a fibrous filler, a plate-shaped filler, a scale-shaped filler, or a flake-shaped filler) and a particulate filler.

A content ratio of the first filler and the second filler in the molded body may be, for example, 35:65 to 65:35, 40:60 to 60:40, or 45:55 to 55:45 on a volume basis.

An average value of the aspect ratios of the all fillers in the molded body is, for example, preferably 10 or more and 500 or less, more preferably 20 or more and 450 or less, and still more preferably 30 or more and 400 or less.

The aspect ratio of the filler is determined by analyzing a three-dimensional image obtained by FIB-SEM.

A method of three-dimensionally analyzing the molded body with focused ion beam scanning electron microscopes (FIB-SEM) and a method of obtaining an average value of the aspect ratios of the filler will be described.

The molded body is cut into a rectangular parallelepiped having a width of 1 mm and is embedded in an epoxy resin. Cross-sectional processing is performed on an embedded product with a microtome to form a block cross-section in which a cross-section taken in the thickness direction of the molded body is seen. The sample with the formed block cross section is fixed to the sample stage of a FIB-SEM (FIB-SEM Helios NanoLab 600i, FEI Company USA), and a vapor deposition treatment is performed. FIB processing and SEM observation of the block cross-section are repeated with the FIB-SEM instrument, thereby two-dimensional stacking images are obtained. The FIB processing and the SEM observation are repeated until at least 100 fillers are observed. The SEM observation is performed at a magnification ratio where the fillers dispersed in the molded body can be observed.

The two-dimensional stacking images are input to three-dimensional image analysis software (Avizo-Fire, VSG), thereby a three-dimensional image is formed.

At least 100 fillers are randomly selected in the formed three-dimensional image.

For each of the randomly selected fillers, the X axis of three mutually orthogonal axes (X axis, Y axis, and Z axis) is aligned with the major axis direction of the filler, and the length of the filler along each of the X axis, Y axis, and Z axis is measured. Among the filler lengths along the three axes, a ratio of the longest length (the filler length along the X axis, that is, a length along the major axis) to the shortest length (the filler length along the Y axis or the filler length along the Z axis) is defined as an aspect ratio. Aspect ratios of at least 100 fillers are arithmetically averaged to obtain an average value.

An average value of the major axis lengths of the all fillers in the molded body (that is, the above-described average value of the lengths of the fillers in the X-axis) is, for example, preferably 10 μm or more and 200 μm or less, more preferably 20 μm or more and 150 μm or less, and still more preferably 30 μm or more and 100 μm or less.

From the viewpoint of balance between thermal conductivity and bending resistance of the molded body, a volume proportion of the filler in the molded body is, for example, preferably 10% by volume or more and 50% by volume or less, more preferably 12% by volume or more and 48% by volume or less, and still more preferably 15% by volume or more and 45% by volume or less.

The volume proportion of the filler in the molded body is determined by analyzing a three-dimensional image obtained by FIB-SEM.

Characteristics of Molded Body

In the molded body according to the exemplary embodiment of the present disclosure, for example, the thermal conductivity in the thickness direction is preferably 1.0 W/m·K or more, more preferably 1.5 W/m·K or more, and still more preferably 2.0 W/m·K or more.

In the molded body according to the exemplary embodiment of the present disclosure, for example, from the viewpoint of heat storage properties, for example, the thermal conductivity in the thickness direction is preferably 6.0 W/m·K or less, more preferably 5.0 W/m·K or less, and still more preferably 4.0 W/m·K or less.

A method of measuring the thermal conductivity (W/m·K) in the thickness direction of the molded body according to the exemplary embodiment of the present disclosure is as follows.

The sample to be measured is a sample of 2 mm×2 mm×thickness direction, which has been taken from the middle portion of the maximum surface of the molded body while maintaining the thickness of the molded body.

The thermal diffusivity in the thickness direction is measured at room temperature (25° C.±3° C.) using a thermal diffusivity measuring device, and the thermal conductivity (W/m·K) is calculated by multiplying the thermal diffusivity by the specific heat and the density.

In a case where the molded body according to the exemplary embodiment of the present disclosure is in a film shape, the molded body may be a flat film or a tubular film.

In a case where the molded body according to the exemplary embodiment of the present disclosure is in a film shape, the average thickness thereof may be set according to the application, and for example, the average thickness is 10 μm or more and 1,000 μm or less, 15 μm or more and 800 μm or less, or 20 μm or more and 500 μm or less.

In a case where the molded body according to the exemplary embodiment of the present disclosure is in a film shape, examples of a production method thereof include a production method of sequentially performing the following steps (1) to (3).

Step (1): A resin or rubber and fillers are mixed to prepare a coating liquid. A solvent or a dispersion medium is also mixed as needed.

Step (2): The coating liquid is applied to a base body and dried to form a coating film.

Step (3): The coating film is calcined to obtain the molded body.

In a case where a cylindrical mold is used as the base body of Step (2), a tubular molded body can be manufactured.

Examples of the applications of the molded body according to the exemplary embodiment of the present disclosure include a sheet that is installed on an electronic device for the purpose of absorbing or dissipating heat, a tubular fixing member of an image forming apparatus, and the like.

Composite

The composite according to the exemplary embodiment of the present disclosure includes the molded body according to the exemplary embodiment of the present disclosure.

The composite according to the exemplary embodiment of the present disclosure may be a composite in which only a plurality of molded bodies according to the exemplary embodiment of the present disclosure are combined, or may be a composite in which the molded body according to the exemplary embodiment of the present disclosure and the other object are combined.

In a case where the composite according to the exemplary embodiment of the present disclosure contains the other object other than the molded body according to the exemplary embodiment of the present disclosure, the material and shape of the other object are not limited.

Examples of the other object contained in the composite according to the exemplary embodiment of the present disclosure include objects made of polymer materials, objects made of metal materials, objects in which polymer materials and metal materials are combined, and the like.

The form and application of the composite according to the exemplary embodiment of the present disclosure are not limited. Examples of applications of the composite according to the exemplary embodiment of the present disclosure include heat conductive sheets, heat radiating sheets, furniture, building materials, machine components, vehicle components, aircraft components, and the like.

Examples of exemplary embodiment of the composite according to the present disclosure include a laminated film including the molded body of the present disclosure, which has been formed in a film shape. Here, the molded body according to the exemplary embodiment of the present disclosure may be a flat film or a tubular film.

Hereinafter, the laminated film will be described in detail.

Laminated Film

The laminated film of the present disclosure includes the molded body according to the exemplary embodiment of the present disclosure, which has been formed in a film shape.

The laminated film of the present disclosure may be a laminated film in which only the molded body according to the exemplary embodiment of the present disclosure is laminated, or may be a laminated film in which the molded body according to the exemplary embodiment of the present disclosure and another film (for example, a film having releasability, a metal base plate, a ceramic film, or the like) are laminated. An adhesive layer may be provided between the respective films that are laminated.

The laminated film of the present disclosure may have one layer of the molded body according to the exemplary embodiment of the present disclosure, which has been formed in a film shape, or may have two or more layers thereof. In a case where the laminated film of the present disclosure includes two or more molded bodies according to the exemplary embodiment of the present disclosure, the two or more molded bodies may have the same or different components and/or compositions.

In a case where the laminated film of the present disclosure includes two or more molded bodies according to the exemplary embodiment of the present disclosure, which have been formed in a film shape, the laminated film of the present disclosure may be a laminated film in which only the first molded body is laminated, a laminated film in which only the second molded body is laminated, or a laminated film in which the first molded body and the second molded body are laminated. The lamination order of these molded bodies is not restricted.

The laminated film of the present disclosure may be a flat film or may be a tubular film. Examples of the applications of the laminated film of the present disclosure include a sheet that is installed on an electronic device for the purpose of absorbing or dissipating heat, a tubular fixing member of an image forming apparatus, and the like.

Tubular Fixing Member

The tubular fixing member according to the exemplary embodiment of the present disclosure includes the molded body according to the exemplary embodiment of the present disclosure, which has been formed in a tubular shape.

The tubular fixing member according to the exemplary embodiment of the present disclosure may be a member consisting of only the molded body according to the exemplary embodiment of the present disclosure, may be a member in which the molded body according to the exemplary embodiment of the present disclosure and another film are laminated, or may be a member in which a plurality of molded bodies according to the exemplary embodiment of the present disclosure are laminated. In a case where a plurality of molded bodies according to the exemplary embodiment of the present disclosure are laminated, the plurality of molded bodies may be identical to each other or different from each other in terms of components and/or composition.

Examples of the tubular fixing member according to the exemplary embodiment of the present disclosure include a form in which a substrate layer, an elastic layer, and a release layer are laminated in this order and one or both of the substrate layer or the elastic layer is the molded body according to the exemplary embodiment of the present disclosure.

Examples of the above-described exemplary embodiment include an aspect in which the substrate layer is the first molded body and/or the elastic layer is the second molded body.

FIG. 1 is a schematic cross-sectional view showing an example of a tubular fixing member according to an exemplary embodiment of the present disclosure.

The tubular fixing member 110 shown in FIG. 1 includes a substrate layer 110A, an elastic layer 110B that is provided on the substrate layer 110A, and a release layer 110C that is provided on the elastic layer 110B. An adhesive layer may be provided between the substrate layer 110A and the elastic layer 110B and/or between the elastic layer 110B and the release layer 110C. One or both of the substrate layer 110A or the elastic layer 110B is the molded body according to the exemplary embodiment of the present disclosure. The substrate layer 110A is, for example, preferably the first molded body. The elastic layer 110B is, for example, preferably the second molded body.

From the viewpoint of durability and thermal conductivity, an average thickness of the substrate layer 110A is, for example, preferably 20 μm or more and 200 μm or less, more preferably 30 μm or more and 150 μm or less, and still more preferably 40 μm or more and 100 μm or less.

From the viewpoint of durability and thermal conductivity, an average thickness of the elastic layer 110B is, for example, preferably 30 μm or more and 500 μm or less, more preferably 50 μm or more and 480 μm or less, and still more preferably 80 μm or more and 450 μm or less.

It is desired that the release layer 110C contains, for example, a release material having heat resistance. Examples of the release material having heat resistance include a fluororesin. Examples of the fluororesin include a tetrafluoroethylene-perfluoroalkyl vinyl ether copolymer (PFA), polytetrafluoroethylene (PTFE), a tetrafluoroethylene-hexafluoropropylene copolymer (FEP), polyethylene tetrafluoroethylene (ETFE), polyvinylidene fluoride (PVDF), polychlorotrifluoroethylene (PCTFE), vinyl fluoride (PVF), and the like.

Various additives may be contained in the release layer 110C. Examples of the additives include fillers (calcium carbonate and the like), functional fillers (alumina and the like), softeners (paraffin and the like), processing aids (stearic acid and the like), anti-aging agents (amine and the like), cross-linking agents, and the like.

An average thickness of the release layer 110C is, for example, preferably 5 μm or more and 30 μm or less, more preferably 10 μm or more and 25 μm or less, and still more preferably 15 μm or more and 20 μm or less.

The average thickness of each layer included in the tubular fixing member is an arithmetic average value of the thicknesses of the layer that are measured by an eddy current film thickness meter at a total of 40 points, that is, at 10 points arranged at regular intervals in the axial direction of the tubular fixing member at each of four points arranged at intervals of 90° in the circumferential direction.

The exemplary embodiment of the tubular fixing member according to the present disclosure is not limited to the aspect shown in FIG. 1. For example, any of an aspect in which the substrate layer 110A is absent, an aspect in which the elastic layer 110B is absent, or an aspect in which the release layer 110C is absent may be adopted.

Examples of the shape of the tubular fixing member according to the exemplary embodiment of the present disclosure include a cylindrical shape and a belt shape.

The tubular fixing member according to the exemplary embodiment of the present disclosure may be a fixing belt or may be a fixing roller.

Fixing Device

A fixing device according to an exemplary embodiment of the present disclosure includes a first rotating body and a second rotating body that is disposed in contact with an outer surface of the first rotating body, and causes a recording medium in which a toner image is formed on a surface to pass through a contact portion between the first rotating body and the second rotating body to fix the toner image to the recording medium. At least one of the first rotating body or the second rotating body is a rotating body that applies heat to the recording medium and is the tubular fixing member according to the exemplary embodiment of the present disclosure.

Examples of the fixing device according to the exemplary embodiment of the present disclosure include a first exemplary embodiment and a second exemplary embodiment.

A fixing device according to the first exemplary embodiment includes a heating roller and a pressure belt, and at least the heating roller is the tubular fixing member according to the exemplary embodiment of the present disclosure.

A fixing device according to the second exemplary embodiment includes a heating belt and a pressure roller, and at least the heating belt is the tubular fixing member according to the exemplary embodiment of the present disclosure.

First Exemplary Embodiment

Figure 2:
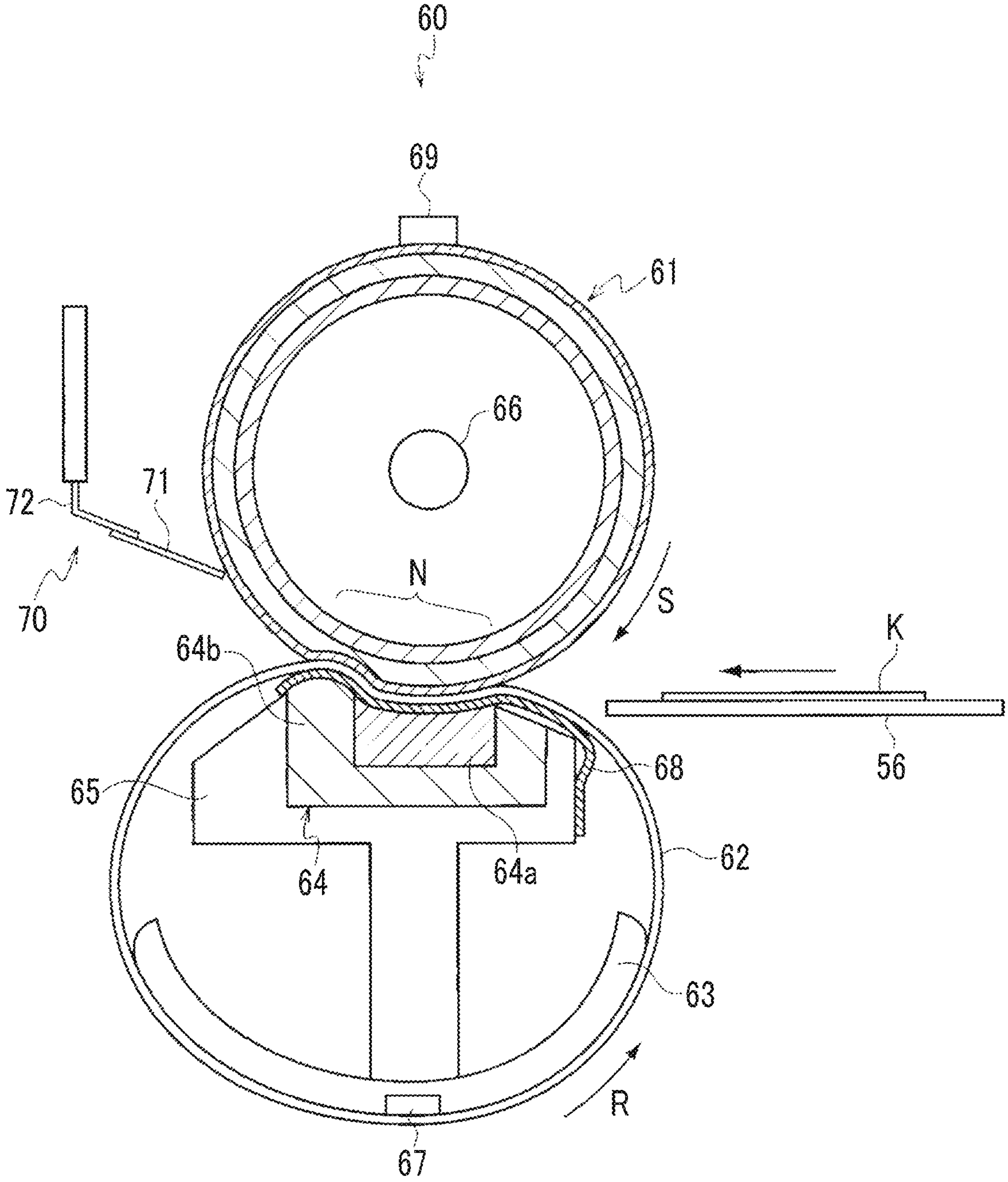
FIG. 2 is a schematic configuration diagram showing an example of a fixing device according to a first exemplary embodiment of the present disclosure.

FIG. 2 is a schematic diagram showing a fixing device 60 according to a first exemplary embodiment.

The fixing device 60 includes a heating roller 61 (an example of the first rotating body) and a pressure belt 62 (an example of the second rotating body).

A halogen lamp 66 (an example of a heating device) is disposed in the heating roller 61. A temperature-sensitive element 69 is disposed in contact with the surface of the heating roller 61. The lighting of the halogen lamp 66 is controlled on the basis of a temperature value measured by the temperature-sensitive element 69, so that the surface temperature of the heating roller 61 is maintained at a target set temperature (for example, 150° C.).

The pressure belt 62 is rotatably supported by a pressing pad 64 and a belt traveling guide 63 that are disposed inside the pressure belt 62.

The pressing pad 64 presses the pressure belt 62 against the heating roller 61. The pressure belt 62 is pressed against the heating roller 61 by the pressing pad 64, so that a nip region N (nip portion) is formed.

The pressing pad 64 includes a nip member **64*a* and a nip member 64*b*. The nip member 64*a* is disposed on the entrance side of the nip region N to ensure a wide nip region N. The nip member 64*b* is disposed on the exit side of the nip region N to cause strain on the heating roller 61** and to facilitate the peeling of a recording medium.

A sheet-like sliding member 68 is disposed between the pressing pad 64 and the pressure belt 62 to reduce sliding resistance between the inner circumferential surface of the pressure belt 62 and the pressing pad 64. The pressing pad 64 and the sliding member 68 are held by a holding member 65 made of metal. The belt traveling guide 63 is mounted on the holding member 65. A lubricant supply device 67, which is a device for supplying a lubricant (oil) to the inner circumferential surface of the pressure belt 62, is mounted on the belt traveling guide 63.

A peeling member 70 is an auxiliary member for peeling off a recording medium from the fixing device 60, and is disposed on the downstream side of the nip region N. The peeling member 70 includes a peeling claw 71 and a holding member 72. The peeling claw 71 is held at a position close to the heating roller 61 by the holding member 72.

The heating roller 61 is rotationally driven by a drive motor (not shown). The heating roller 61 is rotated in a direction of an arrow S by the drive motor, and the pressure belt 62 is rotated in a direction of an arrow R while following the rotation of the heating roller 61. A sheet K (an example of a recording medium) including an unfixed toner image is guided by a fixing entrance guide 56, and is transported to the nip region N. When the sheet K passes through the nip region N, the toner image on the sheet K is fixed by pressure and heat.

Second Exemplary Embodiment

Figure 3:
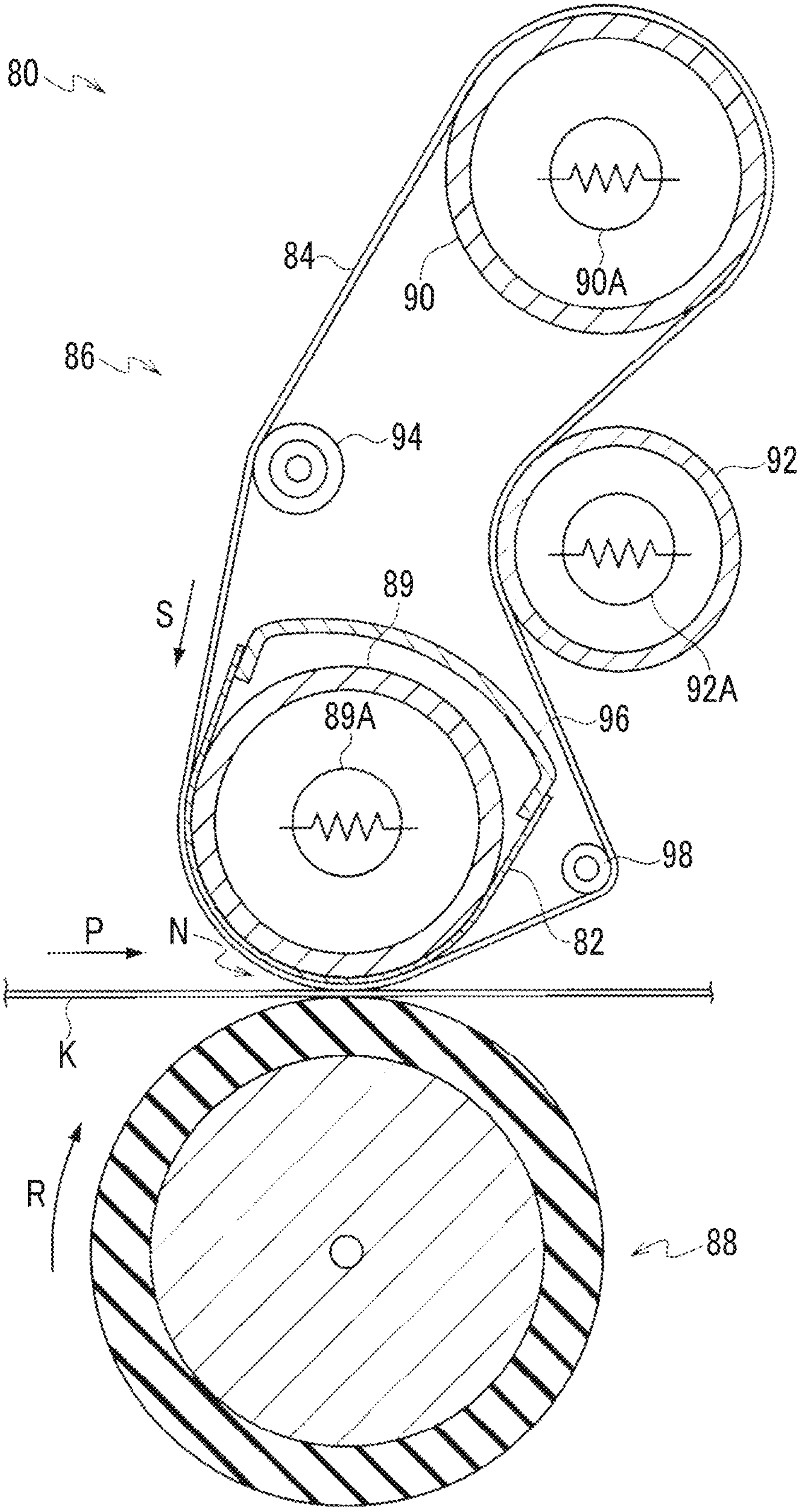
FIG. 3 is a schematic configuration diagram showing an example of a fixing device according to a second exemplary embodiment of the present disclosure.

FIG. 3 is a schematic diagram showing a fixing device 80 according to a second exemplary embodiment.

The fixing device 80 includes a fixing belt module 86 that includes a heating belt 84 (an example of the first rotating body), and a pressure roller 88 (an example of the second rotating body) that is disposed to be pressed against the heating belt 84 (fixing belt module 86).

A nip region N (nip portion) is formed at a contact portion between the heating belt 84 (fixing belt module 86) and the pressure roller 88.

The fixing belt module 86 includes a heating belt 84, a heating pressing roller 89, a support roller 90, a support roller 92, a posture correction roller 94, and a support roller 98. The heating belt 84 is wound around the heating pressing roller 89 and the support roller 90. The heating pressing roller 89 is rotationally driven by a drive motor (not shown), and presses the heating belt 84 against the pressure roller 88 from the inner circumferential surface of the heating belt 84. The support roller 92 is disposed outside the heating belt 84, and defines a circumferential path of the heating belt 84. The posture correction roller 94 corrects the posture of the heating belt 84 between the support roller 90 and the heating pressing roller 89, and suppresses the meandering of the heating belt 84. The support roller 98 applies tension to the heating belt 84 from the inner circumferential surface of the heating belt 84 on the downstream side of the nip region N.

A sheet-like sliding member 82 is disposed between the heating belt 84 and the heating pressing roller 89 to reduce sliding resistance between the inner circumferential surface of the heating belt 84 and the heating pressing roller 89. The sliding member 82 is disposed in a state where both ends of the sliding member 82 are supported by a support member 96.

A halogen heater 89A (an example of a heating device) is disposed in the heating pressing roller 89, and heats the heating belt 84 from the inner circumferential surface side of the heating belt 84.

A halogen heater 90A (an example of a heating device) is disposed in the support roller 90, and heats the heating belt 84 from the inner circumferential surface side of the heating belt 84.

A halogen heater 92A (an example of a heating device) is disposed in the support roller 92, and heats the heating belt 84 from the outer circumferential surface side of the heating belt 84.

The pressure roller 88 is rotatably supported, and is provided to be pressed against a portion of the heating belt 84, which is wound around the heating pressing roller 89, by a biasing unit (not shown). The heating belt 84 is rotationally moved in a direction of an arrow S as the heating pressing roller 89 is rotationally driven, and the pressure roller 88 is rotationally moved in a direction of an arrow R while following the rotational movement of the heating belt 84.

A sheet K (an example of a recording medium) including an unfixed toner image is transported in a direction of an arrow P, and is guided to the nip region N of the fixing device 80. When the sheet K passes through the nip region N, the toner image on the sheet K is fixed by pressure and heat.

Image Forming Apparatus

An image forming apparatus according to an exemplary embodiment of the present disclosure includes an image holding body, a charging device that charges a surface of the image holding body, an electrostatic latent image forming device that forms an electrostatic latent image on the charged surface of the image holding body, a developing device that develops the electrostatic latent image formed on the surface of the image holding body with a developer containing toner to form a toner image, a transfer device that transfers the toner image onto a surface of a recording medium, and the fixing device according to the exemplary embodiment of the present disclosure that fixes the toner image to the recording medium. The fixing device may be a cartridge that can be attached to and detached from the image forming apparatus.

Figure 4:
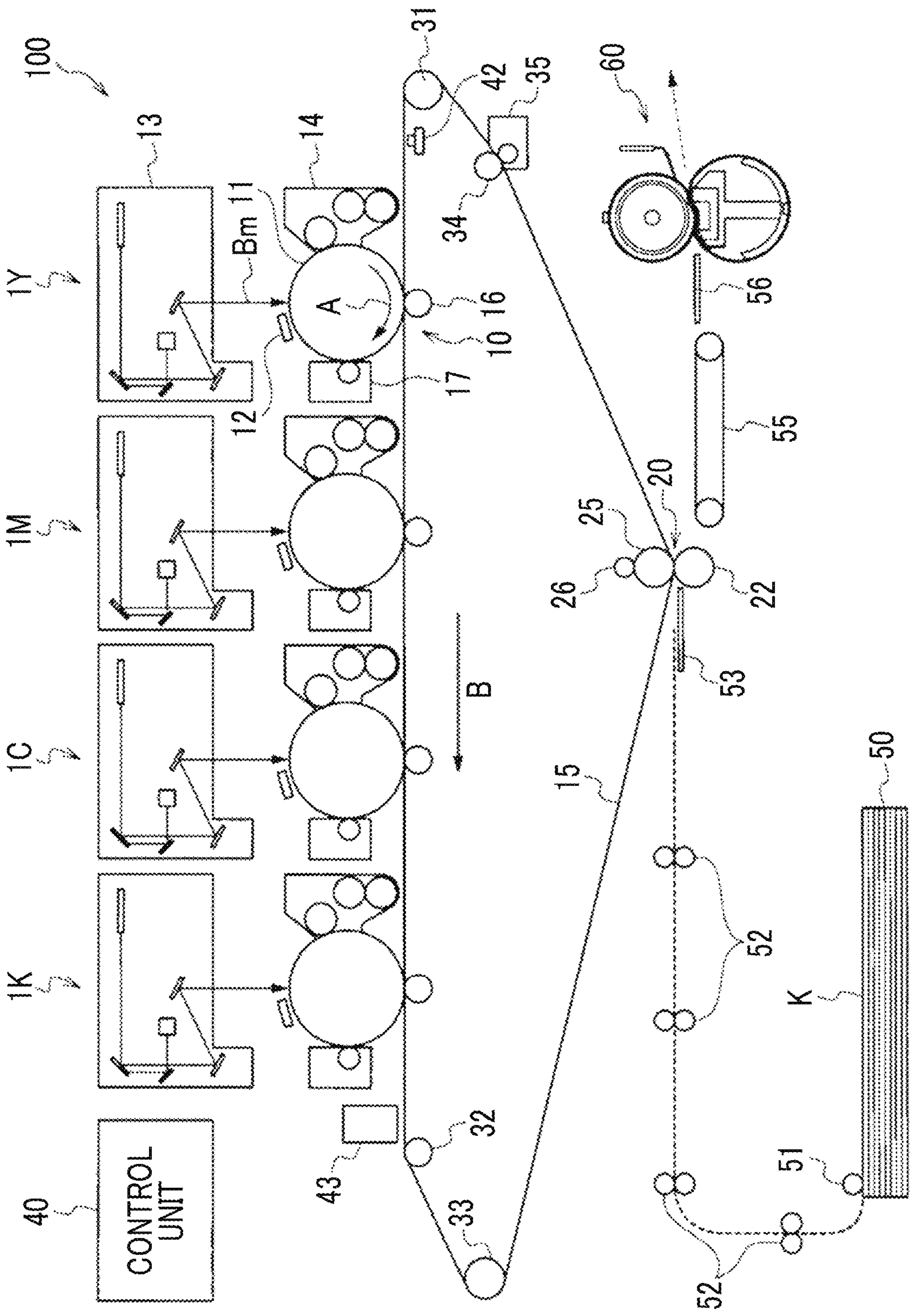
FIG. 4 is a schematic configuration diagram showing an example of an image forming apparatus according to an exemplary embodiment of the present disclosure.

FIG. 4 is a schematic diagram showing the configuration of the image forming apparatus 100 according to the present exemplary embodiment. The image forming apparatus 100 includes the fixing device 60 according to the first exemplary embodiment described above. The image forming apparatus 100 may include the fixing device 80 according to the second exemplary embodiment described above instead of the fixing device 60.

The image forming apparatus 100 is an intermediate transfer image forming apparatus that is generally called a tandem-type image forming apparatus. The image forming apparatus 100 includes image forming units 1Y, 1M, 1C, and 1K in which toner images having the respective colors are formed by an electrophotographic method, primary transfer units 10 that sequentially transfer (primarily transfer) the toner images having the respective colors onto an intermediate transfer belt 15, a secondary transfer unit 20 that collectively transfers (secondarily transfers) superimposed toner images transferred onto the intermediate transfer belt 15 to a sheet K, which is a recording medium, the fixing device 60 that fixes the secondarily transferred images onto the sheet K, and a controller 40 that controls the operation of each device (each unit).

The image forming units 1Y, 1M, 1C, and 1K are substantially linearly arranged in the order of 1Y (unit for yellow), 1M (unit for magenta), 1C (unit for cyan), and 1K (unit for black) from the upstream side of the intermediate transfer belt 15.

Each of the image forming units 1Y, 1M, 1C, and 1K includes a photoreceptor 11 (an example of the image holding body). The photoreceptor 11 is rotated in a direction of an arrow A.

A charging unit 12 (an example of a charging device), a laser exposure unit 13 (an example of an electrostatic latent image forming device), a developing unit 14 (an example of a developing device), a primary transfer roller 16, and a photoreceptor cleaner 17 are sequentially arranged around the photoreceptor 11 in a rotation direction of the photoreceptor 11.

The charging unit 12 charges the surface of the photoreceptor 11.

The laser exposure unit 13 emits an exposure beam Bm to form an electrostatic latent image on the photoreceptor 11.

The developing unit 14 stores toner having each color, and changes the electrostatic latent image formed on the photoreceptor 11 into a visible image with the toner.

The primary transfer roller 16 transfers the toner image formed on the photoreceptor 11 onto the intermediate transfer belt 15 at the primary transfer unit 10.

The photoreceptor cleaner 17 removes residual toner remaining on the photoreceptor 11.

The intermediate transfer belt 15 is a belt consisting of a material in which an antistatic agent, such as carbon black, is added to a resin, such as polyimide or polyamide. The intermediate transfer belt 15 has a volume resistivity of, for example, $1\times10^{6}$ Ω·cm or more and $1\times10^{14}$ Ω·cm or less and has a thickness of, for example, 0.1 mm.

The intermediate transfer belt 15 is supported by a drive roller 31, a support roller 32, a tension applying roller 33, a back roller 25, and a cleaning back roller 34, and is driven to circulate (is rotated) in a direction of an arrow B according to the rotation of the drive roller 31.

The drive roller 31 is driven by a motor (not shown) having an excellent constant speed property and rotates the intermediate transfer belt 15.

The support roller 32 supports the intermediate transfer belt 15, which substantially linearly extends in an arrangement direction of four photoreceptors 11, together with the drive roller 31.

The tension applying roller 33 applies constant tension to the intermediate transfer belt 15, and functions as a correction roller that suppresses the meandering of the intermediate transfer belt 15.

The back roller 25 is provided in the secondary transfer unit 20, and the cleaning back roller 34 is provided in a cleaning unit that scrapes off residual toner remaining on the intermediate transfer belt 15.

The primary transfer roller 16 is disposed in pressure contact with the photoreceptor 11 with the intermediate transfer belt 15 interposed between the photoreceptor 11 and the primary transfer roller 16, and forms the primary transfer unit 10.

A voltage (primary transfer bias) having a polarity opposite to the charging polarity of the toner (referred to as a negative polarity, the same applies hereinafter) is applied to the primary transfer roller 16. Accordingly, the toner images formed on the respective photoreceptors 11 are sequentially electrostatically attracted to the intermediate transfer belt 15, so that the superimposed toner images are formed on the intermediate transfer belt 15.

The primary transfer roller 16 is a cylindrical roller that includes a shaft (for example, a columnar rod made of metal, such as iron or SUS) and an elastic layer (for example, a sponge layer made of blended rubber with which a conductive agent, such as carbon black, is mixed) fixed around the shaft. The primary transfer roller 16 has a volume resistivity of, for example, $1\times10^{7.5}$ Ω·cm or more and $1\times10^{8.5}$ Ω·cm or less.

A secondary transfer roller 22 is disposed in pressure contact with the back roller 25 with the intermediate transfer belt 15 interposed between the back roller 25 and the secondary transfer roller 22, and forms the secondary transfer unit 20.

The secondary transfer roller 22 forms a secondary transfer bias between the back roller 25 and the secondary transfer roller 22, and secondarily transfers the toner images onto the sheet K (recording medium) transported to the secondary transfer unit 20.

The secondary transfer roller 22 is a cylindrical roller that includes a shaft (for example, a columnar rod made of metal, such as iron or SUS) and an elastic layer (for example, a sponge layer made of blended rubber with which a conductive agent, such as carbon black, is mixed) fixed around the shaft. The secondary transfer roller 22 has a volume resistivity of, for example, $1\times10^{7.5}$ Ω·cm or more and $1\times10^{8.5}$ Ω·cm or less.

The back roller 25 is disposed on the back side of the intermediate transfer belt 15 to form a counter electrode of the secondary transfer roller 22, and forms a transfer electric field between the secondary transfer roller 22 and the back roller 25.

For example, a rubber substrate is covered with a tube made of blended rubber in which carbon is dispersed, so that the back roller 25 is formed. The back roller 25 has a surface resistivity of, for example, $1\times10^{7}$Ω/□ or more and $1\times10^{10}$Ω/□ or less, and has a hardness of, for example, 70° (Asker C manufactured by Kobunshi Keiki Co., Ltd., the same applies hereinafter).

A power feed roller 26 made of metal is disposed in contact with the back roller 25. The power feed roller 26 applies a voltage (secondary transfer bias) having a polarity identical to the charging polarity of the toner (negative polarity) to form a transfer electric field between the secondary transfer roller 22 and the back roller 25.

An intermediate transfer belt cleaner 35 is provided on the downstream side of the secondary transfer unit 20 on the intermediate transfer belt 15 to be freely attachable to and detachable from the intermediate transfer belt 15. The intermediate transfer belt cleaner 35 removes residual toner and paper dust on the intermediate transfer belt 15 after the secondary transfer.

A reference sensor (home position sensor) 42 is provided on the upstream side of the image forming unit 1Y. The reference sensor 42 generates a reference signal that serves as a reference used to take an image formation timing in each image forming unit. The reference sensor 42 recognizes a mark provided on the back side of the intermediate transfer belt 15 and generates a reference signal, and the image forming units 1Y, 1M, 1C, and 1K start to form images according to an instruction given from the controller 40 that recognizes this reference signal.

An image density sensor 43 used to adjust image quality is provided on the downstream side of the image forming unit 1K.

The image forming apparatus 100 includes a sheet storage part 50, a sheet feed roller 51, transport rollers 52, a transport guide 53, a transport belt 55, and a fixing entrance guide 56 as a transport unit for transporting a sheet K.

The sheet storage part 50 stores sheets K on which images are not yet formed.

The sheet feed roller 51 takes out a sheet K stored in the sheet storage part 50.

The transport rollers 52 transport the sheet K that is taken out by the sheet feed roller 51.

The transport guide 53 sends the sheet K, which is transported by the transport rollers 52, to the secondary transfer unit 20.

The transport belt 55 transports the sheet K, onto which images are transferred at the secondary transfer unit 20, to the fixing device 60.

The fixing entrance guide 56 guides the sheet K to the fixing device 60.

A method of forming an image using the image forming apparatus 100 will be described.

In the image forming apparatus 100, image data output from an image reading device (not shown), a computer (not shown), or the like are subjected to image processing via an image processing device (not shown) and work for forming images is performed by the image forming units 1Y, 1M, 1C, and 1K.

In the image processing device, image processing, such as shading correction, misregistration correction, brightness/color space conversion, gamma correction, frame removal or color editing, and movement editing, is performed on input reflectance data. Image data on which the image processing is performed are converted into coloring material gradation data of four colors, that is, Y, M, C, and K, and are output to the laser exposure units 13.

The laser exposure unit 13 irradiates each of the photoreceptors 11 of the image forming units 1Y, 1M, 1C, and 1K with an exposure beam Bm according to the input coloring material gradation data.

The surface of each of the photoreceptors 11 of the image forming units 1Y, 1M, 1C, and 1K is charged by the charging unit 12 and is then scanned and exposed by the laser exposure unit 13, so that an electrostatic latent image is formed. The electrostatic latent image formed on each photoreceptor 11 is developed as a toner image having each color by each image forming unit.

The toner image formed on each of the photoreceptors 11 of the image forming units 1Y, 1M, 1C, and 1K is transferred onto the intermediate transfer belt 15 at the primary transfer unit 10 where each photoreceptor 11 and the intermediate transfer belt 15 are in contact with each other. At the primary transfer units 10, a voltage (primary transfer bias) having a polarity opposite to the charging polarity of the toner (negative polarity) is applied to the intermediate transfer belt 15 by the primary transfer rollers 16 and toner images are sequentially superimposed and transferred onto the intermediate transfer belt 15.

The toner images primarily transferred onto the intermediate transfer belt 15 are transported to the secondary transfer unit 20 with the movement of the intermediate transfer belt 15.

At a timing when the toner images reach the secondary transfer unit 20, a sheet K stored in the sheet storage part 50 is transported by the sheet feed roller 51, the transport rollers 52, and the transport guide 53, is fed to the secondary transfer unit 20, and is sandwiched between the intermediate transfer belt 15 and the secondary transfer roller 22.

Then, the toner images on the intermediate transfer belt 15 are electrostatically transferred (secondarily transferred) onto the sheet K at the secondary transfer unit 20 where a transfer electric field is formed.

The sheet K onto which the toner images are electrostatically transferred is peeled off from the intermediate transfer belt 15 by the secondary transfer roller 22 and is transported to the fixing device 60 by the transport belt 55.

The sheet K transported to the fixing device 60 is heated and pressed by the fixing device 60, so that the unfixed toner images are fixed.

An image is formed on the recording medium by the image forming apparatus 100 through the above-mentioned steps.

EXAMPLES

Hereinafter, exemplary embodiments of the molded body will be specifically described based on examples. However, the exemplary embodiments of the molded body are not limited to the examples.

In the following description, unless otherwise specified, "parts" and "%" are based on mass.

In the following description, the synthesis, the production, the treatment, the measurement, and the like are carried out at room temperature (25° C.±3° C.) unless otherwise specified.

Manufacture of Molded Body in which Filler is Dispersed in Resin

Example 1

A polyamic acid solution (TX-HMM, Unitika, Ltd.) and carbon nanotubes are mixed and kneaded with a triple roll mill to prepare coating liquid (1). The polyamic acid solution and the carbon nanotubes are mixed in an amount such that the volume proportion of the carbon nanotube is the volume proportion shown in Table 1 in a case where the polyamic acid solution is cured. In a case where the polyamic acid solution and the carbon nanotubes are kneaded, distances between roll mills and the rotational speeds of the roll mills are adjusted to control a state where the carbon nanotubes are dispersed.

An outer circumferential surface of a cylindrical mold (a diameter of 30 mm) made of aluminum is coated with the coating liquid (1), and the coating liquid (1) is dried for 80 minutes at a temperature of 100° C. The coating amount of coating liquid (1) is adjusted such that the thickness of the molded body is 80 μm. The cylindrical mold including the coating film is displaced in a heating furnace and is heated for 40 minutes at a temperature of 380° C. to calcine the molded body. The cylindrical mold under the molded body is pulled out to obtain a tubular molded body.

Comparative Example 1

A tubular molded body is manufactured in the same manner as in Example 1, except that the distance between the roll mills of the triple roll mill is shortened 1/1.3 times to change the dispersion state of the filler.

Comparative Example 2

A tubular molded body is manufactured in the same manner as in Example 1, except that the volume proportion of the filler is changed as shown in Table 1 and the distance between the roll mills of the triple roll mill is shortened 1/1.5 times to change the dispersion state of the filler.

Comparative Example 3

A tubular molded body is manufactured in the same manner as in Example 1, except that the filler is changed to carbon black and the distance between the roll mills of the triple roll mill is shortened ½ times to change the dispersion state of the filler.

Examples 2 to 7

A tubular molded body is manufactured in the same manner as in Example 1, except that the type, dimensions, and volume proportion of the filler are changed as shown in Table 1.

Example 8

The boron nitride particles are subjected to surface treatment with a silane coupling agent having an isocyanate group to impart an isocyanate group to the surface of the boron nitride particles.

The boron nitride particles are subjected to surface treatment with a silane coupling agent having a hydroxy group to impart a hydroxy group to the surface of the boron nitride particles.

The above-described two types of fillers are mixed, placed into a heating furnace, heated to a temperature of 150° C. at a temperature rising rate of 2° C. per minute, maintained at that temperature for 50 minutes, and then cooled to room temperature to obtain a filler mixture.

A tubular molded body is manufactured in the same manner as in Example 1, except that the filler is changed to a filler mixture, and the temperature rising rate of the heating furnace when putting the cylindrical mold having a coating film into the heating furnace for calcining is changed to half of that in Example 1. The amounts of the two types of boron nitride particles used are the amounts at which the respective volume proportions shown in Table 1 are obtained when the polyamic acid solution is cured.

Example 9

The boron nitride particles are subjected to surface treatment with a silane coupling agent having an epoxy group to impart an epoxy group to the surface of the boron nitride particles.

The aluminum oxide particles are subjected to surface treatment with a silane coupling agent having an amino group to impart an amino group to the surface of the aluminum oxide particles.

The above-described two types of fillers are mixed, placed into a heating furnace, heated to a temperature of 120° C. at a temperature rising rate of 2° C. per minute, maintained at that temperature for 50 minutes, and then cooled to room temperature to obtain a filler mixture.

A tubular molded body is manufactured in the same manner as in Example 1, except that the filler is changed to a filler mixture, and the temperature rising rate of the heating furnace when putting the cylindrical mold having a coating film into the heating furnace for calcining is changed to half of that in Example 1. The amounts of the boron nitride particles used and aluminum oxide particles used are the amounts at which the respective volume proportions shown in Table 1 are obtained when the polyamic acid solution is cured.

Manufacture of Molded Body in which Filler is Dispersed in Rubber

Example 11

Liquid silicone rubber (two-liquid type, X-34-2826-A/B, Shin-Etsu Chemical Co., Ltd.) and carbon nanotubes are mixed and kneaded with a triple roll mill to prepare coating liquid (11). The liquid silicone rubber and the carbon nanotubes are mixed in an amount such that the volume proportion of the carbon nanotube is the volume proportion shown in Table 2 in a case where the liquid silicone rubber is cured. In a case where the liquid silicone rubber and the carbon nanotubes are kneaded, distances between roll mills and the rotational speeds of the roll mills are adjusted to control a state where the carbon nanotubes are dispersed.

An outer circumferential surface of a cylindrical mold (a diameter of 30 mm) made of aluminum is coated with the coating liquid (11), and the coating liquid (11) is dried for 15 minutes at a temperature of 115° C. The coating amount of coating liquid (11) is adjusted such that the thickness of the molded body is 400 μm. The cylindrical mold including the coating film is displaced in a heating furnace and is heated for 2 hours at a temperature of 200° C. to calcine the molded body. The cylindrical mold under the molded body is pulled out to obtain a tubular molded body.

Comparative Example 11

A tubular molded body is manufactured in the same manner as in Example 11, except that the distance between the roll mills of the triple roll mill is shortened 1/1.5 times to change the dispersion state of the filler.

Comparative Example 12

A tubular molded body is manufactured in the same manner as in Example 11, except that the volume proportion of the filler is changed as shown in Table 2 and the distance between the roll mills of the triple roll mill is shortened 1/1.3 times to change the dispersion state of the filler.

Comparative Example 13

A tubular molded body is manufactured in the same manner as in Example 11, except that the filler is changed to carbon black and the distance between the roll mills of the triple roll mill is shortened ½ times to change the dispersion state of the filler.

Examples 12 to 17

A tubular molded body is manufactured in the same manner as in Example 11, except that the type and volume proportion of the filler are changed as shown in Table 2.

Example 18

Boron nitride particles having an isocyanate group on the surface and boron nitride particles having a hydroxy group on the surface, which are used in Example 8, are prepared.

The above-described two types of fillers are mixed, placed into a heating furnace, heated to a temperature of 150° C. at a temperature rising rate of 2° C. per minute, maintained at that temperature for 50 minutes, and then cooled to room temperature to obtain a filler mixture.

A tubular molded body is manufactured in the same manner as in Example 11, except that the filler is changed to a filler mixture. The amounts of the two types of boron nitride particles used are the amounts at which the respective volume proportions shown in Table 2 are obtained when the polyamic acid solution is cured.

Example 19

Boron nitride particles having an epoxy group on the surface and aluminum oxide particles having an amino group on the surface, which are used in Example 9, are prepared.

The above-described two types of fillers are mixed, placed into a heating furnace, heated to a temperature of 120° C. at a temperature rising rate of 2° C. per minute, maintained at that temperature for 50 minutes, and then cooled to room temperature to obtain a filler mixture.

A tubular molded body is manufactured in the same manner as in Example 11, except that the filler is changed to a filler mixture. The amounts of the boron nitride particles used and aluminum oxide particles used are the amounts at which the respective volume proportions shown in Table 2 are obtained when the polyamic acid solution is cured.

Cross-Sectional Analysis of Molded Body

A rectangular parallelepiped of which three sides correspond to an axial direction, a circumferential direction, and a film thickness direction and which has a length of 1 mm in the circumferential direction and is long in the axial direction is cut out from a middle portion of the tubular molded body in an axial direction, and is embedded in an epoxy resin. Cross-sectional processing is performed on an embedded product with a microtome to form a block cross-section in which a cross-section taken in the film thickness direction is seen. The sample with the formed block cross section is fixed to the sample stage of a FIB-SEM (FIB-SEM Helios NanoLab 600i, FEI Company USA), and a vapor deposition treatment is performed. FIB processing and SEM observation of the block cross-section are repeated with the FIB-SEM instrument, so that two-dimensional stacking images are obtained. The FIB processing and the SEM observation are repeated until at least 100 fillers are observed. The SEM observation is performed at a magnification ratio where the fillers dispersed in the molded body can be observed.

The two-dimensional stacking images are input to three-dimensional image analysis software (Avizo-Fire, VSG), so that a three-dimensional image is formed.

100 fillers are randomly selected in the formed three-dimensional image. The major axis length and the aspect ratio of each of the 100 fillers are measured, and the average values are calculated. The results are shown in Tables 1 and 2.

In addition, the volume proportion of the filler in the molded body is determined by analyzing the formed three-dimensional image. The results are shown in Tables 1 and 2.

Measurement of Martens Hardness of Molded Body

A square of 50 mm in the axial direction×50 mm in the circumferential direction is taken from the middle portion of the tubular molded body in the axial direction while maintaining the thickness of the molded body, and this is used as a sample. The measurement is performed as described above using a microhardness tester FISCHERSCOPE HM2000, and the Martens hardness (N/mm$^2$) is obtained from a load-displacement curve. Any 10 points within a region of 50 mm square are measured, and the difference between the maximum value and the minimum value of the Martens hardness (N/mm$^2$) is calculated.

Performance Evaluation of Molded Body

Thermal Conductivity

A square of 2 mm in the axial direction×2 mm in the circumferential direction is taken from the middle portion of the tubular molded body in the axial direction while maintaining the thickness of the molded body, and this is used as a sample. At a room temperature (25° C.±3° C.), the thermal diffusivity of the sample in the film thickness direction is measured using a thermal diffusivity measuring device ai-phase (ai~Phase Co., Ltd.), and the thermal conductivity (W/m·K) of the sample is calculated by multiplying the thermal diffusivity by specific heat and density. The results are shown in Tables 1 and 2.

The abbreviations in Tables 1 and 2 have the following meanings.

PI: polyimide resin
Si rubber: silicone rubber
CNT: carbon nanotubes
CB: carbon black
BN: boron nitride
SiC: silicon carbide
Alumina: aluminum oxide

TABLE 1

| | Material | | | | | | | | | | | | |
|---|---|---|---|---|---|---|---|---|---|---|---|---|---|
| | | First filler | | | | Second filler | | | | Molded body | | | |
| | | | | | | | | | | All fillers | | | |
| | Resin Type — | Type — | Functional group — | Major axis length μm | Content % by volume | Type — | Functional group — | Major axis length μm | Content % by volume | Content % by volume | Aspect ratio — | Martens hardness difference N/mm$^2$ | Thermal conductivity W/m · K |
| Example 1 | PI | CNT | — | 3 | 15 | — | — | — | — | 15 | 200 | 315 | 1.7 |
| Comparative Example 1 | PI | CNT | — | 3 | 15 | — | — | — | — | 15 | 200 | 180 | 0.9 |
| Comparative Example 2 | P1 | CNT | — | 3 | 10 | — | — | — | — | 10 | 200 | 150 | 0.8 |
| Comparative Example 3 | PI | CB | — | 3 | 15 | — | — | — | — | 15 | 10 | 105 | 0.85 |
| Example 2 | PI | CNT | — | 5 | 10 | — | — | — | — | 10 | 15 | 330 | 1.9 |
| Example 3 | PI | BN | — | 8 | 20 | — | — | — | — | 20 | 30 | 320 | 2.2 |
| Example 4 | PI | BN | — | 10 | 30 | — | — | — | — | 30 | 20 | 311 | 3.5 |
| Example 5 | PI | SiC | — | 5 | 40 | — | — | — | — | 40 | 100 | 305 | 4.7 |
| Example 6 | PI | Alumina | — | 10 | 45 | — | — | — | — | 45 | 150 | 307 | 5.1 |
| Example 7 | PI | CNT | — | 3 | 10 | Scale-shaped carbon black | — | 11 | 10 | 20 | 250 | 360 | 2.8 |
| Example 8 | PI | BN | Isocyanate group | 8 | 10 | BN | Hydroxy group | 8 | 10 | 20 | 150 | 340 | 3.6 |
| Example 9 | PI | BN | Epoxy group | 10 | 10 | Alumina | Amino group | 5 | 10 | 20 | 100 | 360 | 4.0 |

TABLE 2

| | Material | | | | | | | | | | | | |
|---|---|---|---|---|---|---|---|---|---|---|---|---|---|
| | | First filler | | | | Second filler | | | | Molded body | | | |
| | | | | | | | | | | All fillers | | | |
| | Rubber Type — | Type — | Functional group — | Major axis length μm | Content % by volume | Type — | Functional group — | Major axis length μm | Content % by volume | Content % by volume | Aspect ratio — | Martens hardness difference N/mm$^2$ | Thermal conductivity W/m · K |
| Example 11 | Si rubber | CNT | — | 3 | 15 | — | — | — | — | 15 | 200 | 10 | 1.5 |
| Comparative Example 11 | Si rubber | CNT | — | 3 | 15 | — | — | — | — | 15 | 200 | 2 | 0.5 |
| Comparative Example 12 | Si rubber | CNT | — | 3 | 10 | — | — | — | — | 10 | 200 | 3 | 0.4 |
| Comparative Example 13 | Si rubber | CB | — | 3 | 15 | — | — | — | — | 15 | 10 | 1 | 0.5 |
| Example 12 | Si rubber | CNT | — | 5 | 10 | — | — | — | — | 10 | 15 | 5 | 1.3 |
| Example 13 | Si rubber | BN | — | 8 | 20 | — | — | — | — | 20 | 30 | 10 | 1.9 |
| Example 14 | Si rubber | BN | — | 10 | 30 | — | — | — | — | 30 | 20 | 11 | 2.0 |
| Example 15 | Si rubber | SiC | — | 5 | 40 | — | — | — | — | 40 | 100 | 7 | 2.5 |

TABLE 2-continued

| | Material | | | | | | | | | Molded body | | | |
|---|---|---|---|---|---|---|---|---|---|---|---|---|---|
| | | First filler | | | | Second filler | | | | All fillers | | Martens | |
| | Rubber Type — | Type — | Functional group — | Major axis length μm | Content % by volume | Type — | Functional group — | Major axis length μm | Content % by volume | Content % by volume | Aspect ratio — | hardness difference N/mm² | Thermal conductivity W/m · K |
| Example 16 | Si rubber | Alumina | — | 10 | 45 | — | — | — | — | 45 | 150 | 8 | 3.0 |
| Example 17 | Si rubber | CNT | — | 3 | 10 | Scale-shaped carbon black | — | 11 | 10 | 20 | 250 | 10 | 2.0 |
| Example 18 | Si rubber | BN | Isocyanate group | 8 | 10 | BN | Hydroxy group | 8 | 10 | 20 | 150 | 12 | 2.2 |
| Example 19 | Si rubber | BN | Epoxy group | 10 | 10 | Alumina | Amino group | 5 | 10 | 20 | 100 | 15 | 2.4 |

The molded body, the composite material, the tubular fixing member, the fixing device, and the image forming apparatus according to the exemplary embodiments of the present disclosure include the following aspects.

(((1)))

A molded body comprising:

a resin; and a filler dispersed in the resin, wherein, in a case where a Martens hardness is measured at 10 locations within a region of 50 mm square on a maximum surface of the molded body, a difference between a maximum value and a minimum value of the Martens hardness is 200 N/mm² or more.

(((2)))

A molded body comprising:

a rubber; and a filler dispersed in the rubber, wherein, in a case where a Martens hardness is measured at 10 locations within a region of 50 mm square on a maximum surface of the molded body, a difference between a maximum value and a minimum value of the Martens hardness is 5 N/mm² or more.

(((3)))

The molded body according to (((1))) or (((2))), wherein the filler includes two or more types of fillers having different shapes from each other or two or more types of fillers having different surface properties from each other.

(((4)))

The molded body according to (((1))) or (((2))), wherein the filler includes a first filler having a first functional group on a surface and a second filler having a second functional group different from the first functional group on the surface.

(((5)))

The molded body according to any one of (((1))) to (((4))), wherein an average value of aspect ratios of the fillers is 10 or more and 500 or less.

(((6)))

The molded body according to any one of (((1))) to (((5))), wherein a volume proportion of the filler in the molded body is 10% by volume or more and 50% by volume or less.

(((7)))

A composite comprising:

the molded body according to any one of (((1))) to ((((8)))

(((8)))

A tubular fixing member comprising:

the molded body according to any one of (((1))) to (((6))), that is molded in a tubular shape.

(((9)))

A fixing device comprising:

a first rotating body; and a second rotating body disposed in contact with an outer surface of the first rotating body, wherein at least one of the first rotating body or the second rotating body is the tubular fixing member according to (((8))), and a recording medium on which a toner image is formed on a surface is passed through a contact portion between the first rotating body and the second rotating body to fix the toner image.

(((10)))

An image forming apparatus comprising:

an image holding body;

a charging device that charges a surface of the image holding body;

an electrostatic latent image forming device that forms an electrostatic latent image on the charged surface of the image holding body;

a developing device that develops the electrostatic latent image formed on the surface of the image holding body with a developer containing a toner to form a toner image;

a transfer device that transfers the toner image onto a surface of a recording medium; and the fixing device according to (((9))) that fixes the toner image on the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A fixing member, comprising:

a molded body, including:

a resin; and a filler mixed with the resin, wherein a difference between a maximum value and a minimum value of a Martens hardness at 10 locations within a region of 50 mm square on a maximum surface of the molded body is 200 N/mm$^2$ or more and 500 N/mm$^2$ or less.

2. The fixing member according to claim 1, wherein the filler includes two or more types of fillers having different shapes from each other or two or more types of fillers having different surface properties from each other.

3. The fixing member according to claim 1, wherein the filler includes a first filler having a first functional group on a surface and a second filler having a second functional group different from the first functional group on the surface.

4. The fixing member according to claim 1, wherein an average value of aspect ratios of the filler is 10 or more and 500 or less.

5. The fixing member according to claim 1, wherein a volume proportion of the filler in the molded body is 10% by volume or more and 50% by volume or less.

6. The fixing member according to claim 1, wherein the filler includes at least one of carbon material, silicon carbide, metal nitride, and metal oxide.

7. The fixing member according to claim 1, wherein an average value of a major axis length of the filler is 3 μm or more and 200 μm or less.

8. A fixing device comprising:

a first rotating body; and a second rotating body disposed in contact with an outer surface of the first rotating body, wherein at least one of the first rotating body or the second rotating body is the fixing member according to claim 1, and a recording medium on which a toner image is formed on a surface is passed through a contact portion between the first rotating body and the second rotating body to fix the toner image.

9. An image forming apparatus comprising:

an image holding body;

a charging device that charges a surface of the image holding body;

an electrostatic latent image forming device that forms an electrostatic latent image on the charged surface of the image holding body;

a developing device that develops the electrostatic latent image formed on the surface of the image holding body with a developer containing a toner to form a toner image;

a transfer device that transfers the toner image onto a surface of a recording medium; and the fixing device according to claim 8 that fixes the toner image on the recording medium.

10. A fixing member, comprising:

a molded body, including:

a rubber; and a filler mixed with the rubber, wherein a difference between a maximum value and a minimum value of a Martens hardness at 10 locations within a region of 50 mm square on a maximum surface of the molded body is 5 N/mm$^2$ or more and 30 N/mm$^2$ or less.

11. The fixing member according to claim 10, wherein the filler includes two or more types of fillers having different shapes from each other or two or more types of fillers having different surface properties from each other.

12. The fixing member according to claim 10, wherein the filler includes a first filler having a first functional group on a surface and a second filler having a second functional group different from the first functional group on the surface.

13. The fixing member according to claim 10, wherein an average value of aspect ratios of the filler is 10 or more and 500 or less.

14. The fixing member according to claim 10, wherein a volume proportion of the filler in the molded body is 10% by volume or more and 50% by volume or less.

15. A fixing device comprising:

a first rotating body; and a second rotating body disposed in contact with an outer surface of the first rotating body, wherein at least one of the first rotating body or the second rotating body is the fixing member according to claim 10, and a recording medium on which a toner image is formed on a surface is passed through a contact portion between the first rotating body and the second rotating body to fix the toner image.

16. An image forming apparatus comprising:

an image holding body;

a charging device that charges a surface of the image holding body;

an electrostatic latent image forming device that forms an electrostatic latent image on the charged surface of the image holding body;

a developing device that develops the electrostatic latent image formed on the surface of the image holding body with a developer containing a toner to form a toner image;

a transfer device that transfers the toner image onto a surface of a recording medium; and the fixing device according to claim 15 that fixes the toner image on the recording medium.

17. The fixing member according to claim 10, wherein the filler includes at least one of carbon material, silicon carbide, metal nitride, and metal oxide.

18. The fixing member according to claim 10, wherein an average value of a major axis length of the filler is 3 μm or more and 200 μm or less.

* * * * *